United States Patent [19]
Overocker

[11] Patent Number: 4,649,836
[45] Date of Patent: Mar. 17, 1987

[54] FERTILIZER INJECTOR

[76] Inventor: Lyle Overocker, R.R. #1, Milford, Iowa 51351

[21] Appl. No.: 771,626

[22] Filed: Sep. 3, 1985

[51] Int. Cl.⁴ .......................................... A01C 23/04
[52] U.S. Cl. ...................................................... 111/6
[58] Field of Search ............... 111/6, 7, 77, 85, 87–91; 137/625.15

[56] References Cited

U.S. PATENT DOCUMENTS

| 2,649,061 | 8/1953 | Hawkins et al. | 111/6 |
| 2,866,422 | 12/1958 | Colson | 111/6 |
| 2,876,718 | 3/1959 | Vaughan | 111/7 |
| 3,131,605 | 5/1964 | La Borde | 137/625.15 |
| 3,434,437 | 3/1969 | Mark et al. | 111/85 |
| 3,759,640 | 9/1973 | Hinckley et al. | 137/625.15 |
| 4,178,860 | 12/1979 | Hines et al. | 111/7 |

FOREIGN PATENT DOCUMENTS

| 397152 | 1/1974 | U.S.S.R. | 111/6 |
| 835334 | 6/1981 | U.S.S.R. | 111/6 |
| 1091872 | 5/1984 | U.S.S.R. | 111/6 |

*Primary Examiner*—James R. Feyrer

[57] ABSTRACT

A device for injecting liquid fertilizer into the earth adjacent the roots of row crops. Radial injectors mounted on a rotating hub serially pass a port from which the liquid fertilizer is led into the spoke, and from there into the earth.

5 Claims, 4 Drawing Figures

FERTILIZER INJECTOR

BACKGROUND AND SUMMARY OF THE INVENTION

This invention pertains to fertilizer applicators, and more particularly to an applicator for specific application of liquid fertilizer directly adjacent the roots of the plants to be fertilized.

Fertilizer is an essential part of present day agriculture. The cultivation of modern, high yielding crops, and the continuing emphasis on high yield has increased the demand for nutrients to the point where manufactured plant nutrients have become nearly essential. Natural fertilizer such as livestock manure simply cannot be applied heavily enough for high yield compared to that achieved with commercial manufactured fertilizer.

However, manufactured fertilizers have become relatively expensive, and also have been criticized as contributing to water quality deterioration because of run off of nitrates and the like especially where the fertilizer is applied at rates above what the plants need or use. Therefore, it becomes very desirable to apply the fertilizer as economically as possible of both quantity and cost.

Liquid fertilizers, because of the ease of accurate measurement and delivery, are therefore attractive for application. Previously this type of fertilizer has been "knifed" into the ground by running the fertilizer through a shoe adapted to open a kerf in the soil and deposit the fertilizer in the kerf. Such devices operate successfully, but with highly concentrated fertilizers, this type of application may be wasteful by leaving fertilizer between plants in certain row crops such as corn.

My invention allows very selective placement of the fertilizer adjacent the roots of each plant in the row. An amount of liquid is metered to each plant from the interior of the delivery device. Means is also provided to salvage material not injected into the ground.

FIGURES

DESCRIPTION

Figure 1:
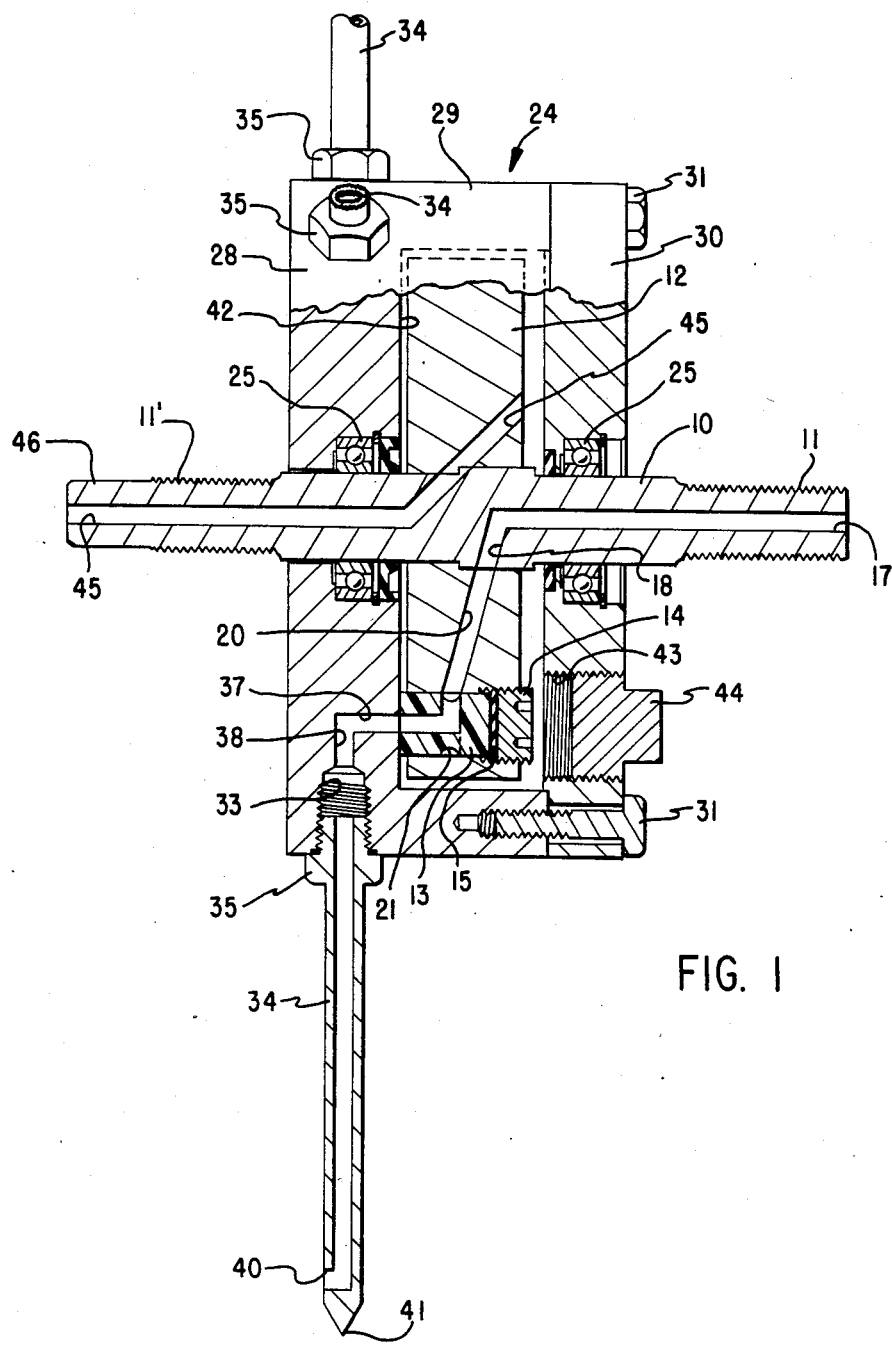
FIG. 1 is a medial sectional view through the device of my invention.
Figure 2:
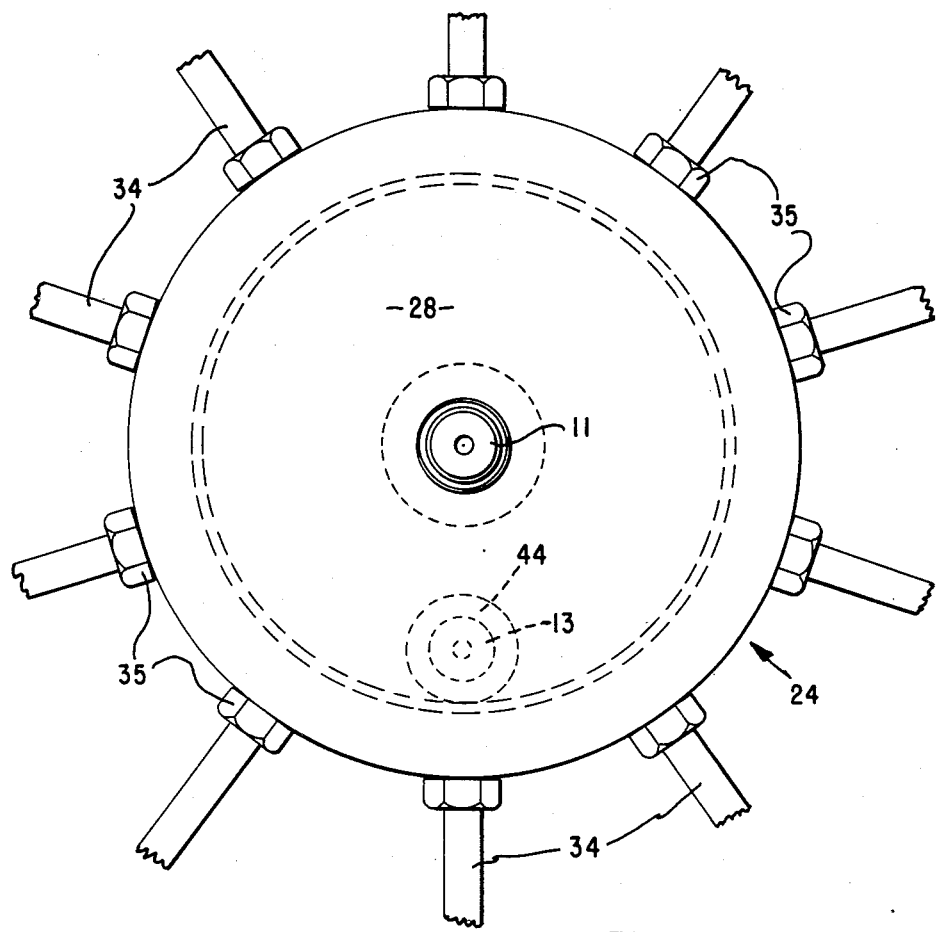
FIG. 2 is an end elevational view of the device.

Briefly my invention comprises a rolling device having spikes adapted to inject fertilizer into the ground adjacent to individual row-crop plants.

More specifically, and referring to the drawings, my device is mounted on a tool-bar (not shown) by means of a fixed axle 10. This axle may have threaded ends 11 and 11' adapted to be clamped into any convenient type of forked or similar mounting.

A central disk 12 may be pressed or otherwise fixed onto or formed with the axle 10. This disk is formed with a socket adapted to hold a metering bushing 13 slidable axially in the socket. One end of the bushing is held in place in the socket by means of a plug 14 threaded into the socket. A resilient washer 15 may be interposed between the plug 14 and the bushing 13 so that the bushing will be urged toward the open end of the socket but will still be allowed some slight axial movement. The other end is adapted to slide over an adjacent surface as will later appear.

The parts thus far described compose a stator assembly designed to conduct liquid fertilizer from a tank to a rotor to be described later. The means by which the fertilizer is transported includes a passageway formed as a hole 17 centrally located from one end 11 of the axle to a point at about the mid point of the axis of the disk 12. At that point another hole 18 forms an extension of the passageway to the exterior of the axle 10, but the passage then continues through the disk 12 through a hole 20 running from the end of the radial hole 18 to the socket in which the bushing 13 is disposed.

Figure 3:
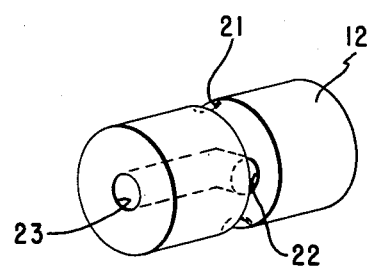
FIG. 3 is a detailed pictorial view of the metering bushing to an enlarged scale.

The bushing 13 is made of a plastic material such as nylon or similar material which will slide readily on a smooth steel surface, and is formed with an annular groove 21 which is proportioned to connect to the passageway part 20 in the stator disc 12. As best shown in FIG. 3, the passage continues from the groove 21 through a radial hole 22 to an axial tube 23. The hole 22 may run all the way through the bushing 13 on a diameter or may simply run from the exterior to the center tube 23.

Surrounding the stator disk 12 is a rotor assembly 24. This assembly is journalled on the axle 10 for rotation about that axis. I have illustrated the use of ball bearings 25, although it will be obvious that other types of bearings may be used. The use of ball bearings may be preferred because of their ability to take not only fairly heavy radial loads, but also some modest axial loads which might be applied to this rotor when the assembly is taken around corners.

The rotor is composed principally of a dished portion formed of an end plate 28 and cylindrical walls 29, and a closure plate 30 which may be fastened to the walls 29 by screws 31. Around the periphery of the end plate 28 are formed a series of radially inset spoke sockets 33. Injector spokes 34 are engaged in the sockets 33 so that the spokes extend radially from the rotor. I prefer to use a threaded engagement of the spokes with the sockets for ease of replacement. To facilitate such replacement, I provide hexagonal bosses 35 on the spokes also. However, it is envisioned that other means of fixing the spokes 34 to the rotor drum member can be used.

In order to provide passage for the liquid to the spoke 34 from the stator, an opening 37 is provided in the end plate 28. This opening must be at the same radius from the centerline of rotation as is the exit from the bushing channel 23 (FIG. 3). Thus, there is communication from the channel 23 to the opening 37 each time that opening rotates past the bushing 13. From the opening 37 each passage leads through a hole 38 to the base of each socket 33. Each spoke 34 is hollow, so that liquid flows from the socket 33 through the base of the spoke 34 to an orifice 40 near the tip of the spoke from which the liquid can be discharged.

Each spoke 34 is formed with a sharpened end 41. The entire device is rotated so that these ends 41 will be inserted into the ground. The sharpened end 41 makes it somewhat easier to insert.

In operation, the axle 10 is fixed in a yoke of any reasonable sort which can be carried by the ordinary tool bar on a farm tractor. This can be done by the use of nuts on the threaded ends 11 and 11' of the axle 10. The axle 10 should be oriented so that the bushing 13 in the stator is at the lowest point. The pipe or tube used to carry the liquid fertilizer from its tank or its pump may be of any convenient sort, and the connection to the passage 17 in the axle should be of the type to adapt to that conducting pipe or tube. Because the axle is stationary, no special fittings are required.

The rotor has previously been mounted on its bearings 25 on the axle 10. It is located so that the smooth inner face 42 of the end plate 28 is relatively close to the adjacent face of the stator 12. The bushing 13 is adapted to slide along the face 42, and the pressure holding that bushing against the face can be adjusted by adjusting the plug 14. In order to accomplish such adjustment after the device is assembled, I provide a fairly large threaded opening 43 closed by a removable plug 44. Thus, the plug 44 can be removed and a screwdriver or an "Allen" wrench or similar device can be inserted through the opening 43 to adjust the inner plug 14 so that the pressure of the bushing 13 against the face 42 of the rotor will be sufficient to provide a reasonable seal to prevent escape of the liquid from its passage toward the orifice 40.

Any liquid which does escape from that passage will be collected within the stator 24. A passageway 45 may be provided through the stator plate 12 and the center of the axle 10 to the end 11' opposite to the end 11 where the liquid is introduced. The end 11' may be formed with a reduced end 46 over which a tube (not shown) may be placed to receive the excess material and conduct it away to an overflow tank directly or through an exhaust pump if desired. It should be noted that while I have illustrated both ends 11 and 11' to be of the same diameter, such construction is not necessary. It might even be desirable to increase the diameter of end 11' so that the exit passage 45 could be enlarged for greater capacity.

The device should be mounted on the tool bar so that there is one injector device for each row of crop. When the assembly is in place, and the tractor carrying the group is in the field ready to start down the rows, the tool bar is dropped until the lowest spoke 34 is pressed into the ground the desired depth (about 4–7 inches ordinarily). The tractor then moves ahead, and the rotor 24 is rotated as the spokes 34 roll over the ground. As any individual spoke arrives at the bottom of its rotation, the opening 37 to that spoke passes the end of the channel 23 in the bushing 13. Because of the pressure on the liquid provided by the pump (not shown) that feeds the liquid to the hole 17 in the stator, the liquid then squirts into the opening 37 and from there through the spoke 34 and out of the orifice 40 into the ground. The length of time over which the discharge takes place can be varied by a number of external variables. For example, the speed of the tractor will control the length of time the opening 37 is in open communicaton with the channel 23. The radial distance of those communicating channels from the center of rotation will cause a direct variation of the lineal speed at which one opening passes the other. The size of the openings will affect directly the time during which the openings are in communication. However, each variable bears a simple relationship to the time so that it is relatively simple to adjust the manufacture or use of the device to provide reasonable control of the amount of fertilizer applied. Another possible control for the control of the amount of fertilizer to be applied, consists of an adjustment of the pressure applied to the liquid fertilizer. This can be controlled by controls on the pump which causes the pressure. However, the other controls are more accurate, and therefore preferable.

Figure 4:
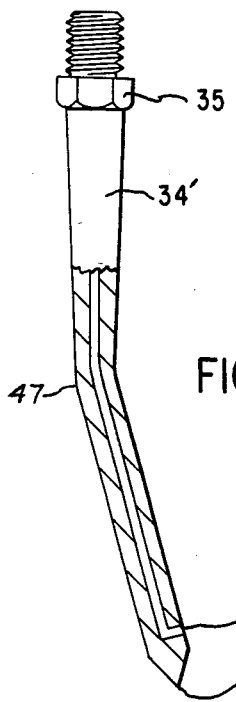
FIG. 4 is a detail view to an enlarged scale of an alternative type of spoke.

In FIG. 4, I illustrate an alternative type of spoke 34'. This spoke is designed to be somewhat stronger and to cause less damage to the seed bed than the simple straight spoke 34. The added strength results from a somewhat enlarged base near the boss 35, and may require somewhat larger threaded sockets in the wall 29 of the end plate 28. However, no other changes are made in the basic structure.

The damage to the seed bed is lessened because of the bent spoke 34'. The bend 47 is such that the spoke tends to pull out of the ground on approximately a straight line, thus leaving only a simple hole, and not a furrow in the ground. The bend for a wheel of ten spokes should be of the order of twenty degrees assuming about a two-inch penetration into the ground.

I claim as my invention:

1. For the injection of liquid fertilizer into the soil and adapted to be carried by a tool bar, an injector means comprising a stator having means for attachment to said tool bar, said stator including an axle and a stator disk, bushing means mounted in said disk, said rotor means being rotatably journalled on said axle, channel means formed in said stator adapted to carry liquid from an inlet on said means for attachment to the tool bar to an outlet formed in said bushing means, rotor means rotatably mounted adjacent said stator, said bushing means including a bushing formed with an annular groove adapted to register with said channel means formed in the stator, said bushing also being formed to provide a passage from said groove to an axial opening exiting through an end of said bushing adjacent said rotor whereby said axial opening forms said outlet in said bushing, spoke means on said rotor means adapted to be serially inserted into the earth as said rotor means is rolled over the ground, channel means for each spoke in said rotor having a rotor inlet adapted to slide serially past said opening in said bushing means, and communicating with the base of each spoke, said spokes being hollow and formed to provide an orifice near an outer tip on each spoke whereby liquid can be conducted from said inlet in the rotor through the hollow spoke and out through said orifice.

2. For the injection of liquid fertilizer into the soil and adapted to be carried by a tool bar, an injector means comprising a stator having means for attachment to said tool bar, said stator including an axle and a stator disk, bushing means mounted in said disk, said rotor means rotatably journalled on said axle, channel means formed in said stator adapted to carry liquid from an inlet on said means for attachment to the tool bar to an outlet formed in said bushing means, rotor means rotatably mounted adjacent said stator, said rotor completely surrounding said stator thus forming a chamber in which said stator is disposed, overflow channel means being formed in said stator plate and axle whereby any overflow of liquid which may accumulate in said chamber will be conducted through said overflow channel from the chamber to an end of said axle, spoke means on said rotor means adapted to be serially inserted into the earth as said rotor means is rolled over the ground, channel means for each spoke in said rotor having a rotor inlet adapted to slide serially past said outlet in said bushing means, and communicating with the base of each spoke, said spokes being hollow and formed to provide an orifice near an outer tip on each spoke whereby liquid can be conducted from said inlet in the rotor through the hollow spoke and out through said orifice.

3. For the injection of liquid fertilizer into the soil and adapted to be carried by a tool bar, an injector means comprising a stator having means for attachment to said tool bar, said stator including an axle and a stator disk, bushing means mounted in said disk, said rotor means rotatably journalled on said axle, channel means formed in said stator adapted to carry liquid from an inlet on said means for attachment to the tool bar to an outlet formed in said bushing means, rotor means rotatably mounted adjacent said stator, said stator being formed with a socket to receive said bushing means, said socket having an axis parallel to the axis of said axle, said bushing means being disposed in said socket for axial sliding, and means on said stator disk to urge said bushing means resiliently against parts of said rotor including a plug threadedly engaged with said stator disk for adjustment axially, and resilient means between said bushing means and said plug, spoke means on said rotor means adapted to be serially inserted into the earth as said rotor means is rolled over the ground, channel means for each spoke in said rotor having an inlet adapted to slide serially past said outlet in said bushing means, and communicating with the base of each spoke, said spokes being hollow and formed to provide an orifice near an outer tip on each spoke whereby liquid can be conducted from said inlet in the rotor through the hollow spoke and out through said orifice.

4. The device of claim 3 in which said rotor completely surrounds said stator, said rotor being formed to provide an opening adapted at one point in its rotation to register with the location of said plug urging said bushing means, and closure means adapted to close said opening to provide an enclosed rotor.

5. The device of claim 3 in which said spokes are threadably attached to said rotor for easy removal and replacement.

* * * * *